Jan. 4, 1944.  H. ULANET  2,338,271

MECHANICAL ADJUSTMENT MEANS

Filed Jan. 3, 1942

INVENTOR.
Herman Ulanet,
BY George D. Richards
ATTORNEY.

Patented Jan. 4, 1944

2,338,271

UNITED STATES PATENT OFFICE 2,338,271

MECHANICAL ADJUSTMENT MEANS

Herman Ulanet, Newark, N. J.

Application January 3, 1942, Serial No. 425,506

1 Claim. (Cl. 74—424.8)

This invention relates to improvements in mechanical adjustment means; and, more particularly, to an improved mechanical movement or device for imparting adjusting movement to a mechanism, apparatus, or parts thereof, required to be adjustingly shifted or governed in use.

The present invention has for an object to provide a novel compound adjusting screw means, operation of the cooperating members of which will provide either deductive or additive, as the case may be, resultant movement of very precise desired degree.

The invention has for another object to provide an adjustment means comprising a novel compound screw structure as the primary source of motion in combination with means for translating the linear movements thereof into rotative movements desired to be imparted to the mechanism, apparatus or parts thereof required to be rotatively shifted or governed in use.

The invention has for a further object to provide as an adjustment means a compound adjusting screw adapted to attain a very delicate degree of adjustment effect, the members of which may be of comparatively coarsely threaded standard pitch, thus eliminating necessity for employing screw means of fine thread and pitch which are easily battered, stripped or otherwise injured to the detriment or defeat of its desired functional operation.

Other objects of this invention, not at this time more particularly enumerated, will be understood from the following detailed description of the same.

Illustrative embodiments of this invention are shown in the accompanying drawing, in which—

Similar characters of reference are employed in the above described views, to indicate corresponding parts.

Figure 1:
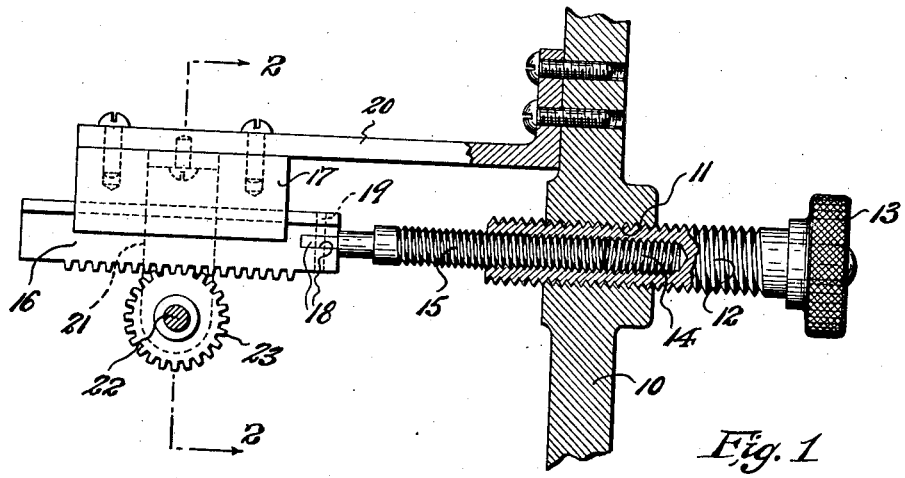
Fig. 1 is a side elevation of an illustrative form of the mechanical adjustment means according to this invention, with parts thereof shown in section.

Referring to the drawing, the reference character 10 indicates any suitable form of stationary support in connection with which the adjusting screw means is operatively mounted, the same having an internally screw threaded opening 11 in and through which the external screw member of said adjusting screw means is operatively engaged.

The adjusting screw means comprises an external screw member 12, the external threads of which turn in the screw threaded opening 11 of the support 10. Affixed to the outer end of said external screw member 12 is a finger piece 13 by which the same may be manipulated. Said external screw member 12 is provided with an internally screw threaded bore 14, extending axially thereinto from its inner end. Engaged by its external screw threads in said screw-threaded bore 14 of the external screw member 12 is an internal screw member 15.

The outer end of said internal screw member 15 is suitably affixed or coupled to means for transmitting its adjusting movement to mechanism, apparatus, or parts thereof desired to be adjustingly shifted or governed, and in such manner that, said internal screw member 15, while free to move linearly, is not permitted to rotate. In some cases, the mechanism, apparatus, or parts thereof desired to be adjusted may be operatively moved by direct transmission thereto of the linear movements of said internal screw member 15, in which cases, the internal screw member 15 may be directly, or through suitable intermediate means, connected with the part or parts to be adjustingly shifted linearly.

Figure 2:
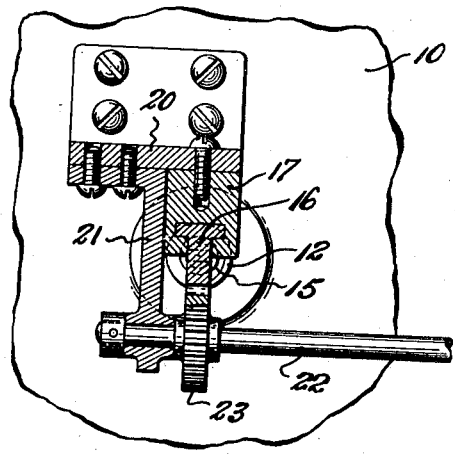
Fig. 2 is a transverse vertical section, taken on line 2—2 in Fig. 1.

In other cases, the part or parts to be adjusted may be of rotative character, in which case, means is provided to translate the linear movements of the internal screw member 15 into rotative movement. One illustrative arrangement for converting the linear movements of the adjusting screw means into transmitted rotative adjusting movements is shown in Figs. 1 and 2; the same comprising a rack 16 slidably mounted in a stationary slideway block 17, and in a disposition whereby said rack is longitudinally aligned with the axis of the adjusting screw means. Means are provided for coupling the rack 16 to the outer free end of the internal screw member 15, as, for example, a tongue and socket coupling connection 18 secured by a coupling pin 19, as shown in Fig. 1. It will be obvious, that, as thus coupled to the rack 16, the internal screw member 15 is free to move linearly, but cannot rotate. The slideway block 17 may be suitably supported in any convenient manner, as, e. g., by means of a carrying bracket 20 affixed to and extending from the support 10. Journaled in a suitably disposed bearing means, as, e. g., the bearing member 21 also dependent from the carrying bracket 20, is one end of a rotative shaft 22. Affixed on said shaft 22 is a gear wheel 23, the teeth of which operatively mesh with those of the rack 16. The shaft 22 may be suitably related to the part or parts desired to be rotatively adjusted whereby to transmit its rotative movements thereto. The rack and gear wheel tooth structure would preferably be of any well known non-backlash type.

In the compound adjusting screw means of this invention, the external screw member 12 may be comparatively coarsely threaded, and the internal screw member 15 may be likewise comparatively coarsely threaded, but where these screw members are both of the same direction, i. e., both of right hand or both of left hand threads, there should be a pitch differential between the same, i. e., one, and preferably the internal screw member, should be of less pitch than the other, whereby, when desired, very minute and accurate adjusting movement may be attained and transmitted.

In the operation of the compound adjusting screw means, assuming that the threads of both the external and internal screw members are either right hand or left hand threads, but of suitable pitch differential, the internal screw member being of lesser pitch (all as shown in Fig. 1), the inturning of the external screw member 12 advances the compound screw assembly as a whole, but, since the internal screw member 15 is held against turning, the same is driven linearly by the internal threads of the rotated external screw member 12. The linear motion thus imparted to the internal screw member 15 is retractive, i. e., in direction opposite to the ingoing movement of the external screw member 12, and by reason of the pitch differential between the external and internal screw members, the retractive movement of the latter produces a deductive effect upon the advance of the screw assembly as a whole. As a consequence of this, a very minute and accurate degree of movement may be transmitted to the rack 16, and, in turn, translated through its geared relation to the shaft 22, to an equally minute or delicate and accurative rotative adjusting movement for application through said shaft 22 to the mechanism, apparatus, or parts thereof desired to be adjustably governed. Such rack and gear wheel conversion of linear adjusting movements to rotative adjusting movements is especially well adapted for ultimate adjusting movements of small amplitude, while yet being capable of obtaining rotative movement of a full three hundred and sixty degrees and beyond, if a proper operative length of adjusting screw assembly and length of rack is provided.

Figure 3:
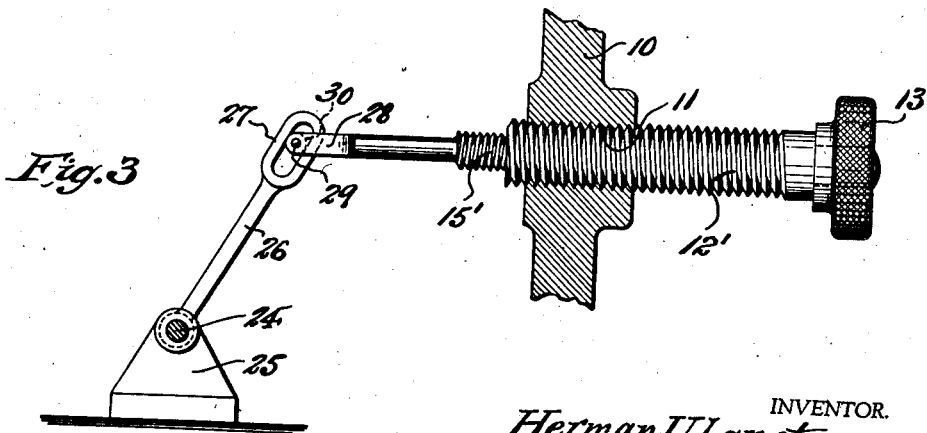
Fig. 3 is a side elevation, with parts in section, showing a modified form of the mechanical adjustment means according to this invention.

In some cases it may be desired that the compound adjusting screw means be capable of an additive linear movement effect rather than a deductive linear movement effect as above described; whereby a maximum or long stroke adjusting screw movement is possible of attainment. An illustrative arrangement of adjusting screw means capable of such additive linear movement effect is shown in Fig. 3 of the accompanying drawing. In this arrangement, the external screw member 12′ is shown to be externally screw threaded with threads of right hand form, whereas the internal screw member 15′ is provided with left hand threads to engage in the correspondingly internally screw threaded bore of said external screw member 12′. When the external screw member 12′ is inturned, the screw assembly is advanced as a whole, but, since the internal screw member 15′ is held against turning, the same is driven linearly outward, i. e., in the same direction, whereby an additive advancing effect of the screw assembly as a whole is produced. In this case, the respective external and internal screw members may be of the same or of differential pitch according to the desired amount of additive projective effect desired to be imparted by the external screw member to the internal screw member.

An advancing effect of the screw assembly as a whole may also be obtained by providing the threads of the external and internal screw members both of either right hand or left hand direction, but making the pitch of the internal screw member greater than that of the external threads of the external screw member.

Fig. 3 also illustrates a modified means cooperative with the adjusting screw means for translating the linear movement of the latter into a desired rotative movement; especially where such rotative movement is desired to be of an amplitude of but a limited part of a half-revolution. In such modified arrangement, a rotative shaft 24 is mounted in suitable bearing means 25, and to the shaft is affixed a lever arm 26 having a slotted free end portion 27. Connected with the outer end of the internal screw member is a yoke element 28 adapted to straddle said slotted end portion 27 of the lever arm 26. Said yoke element carries a wrist or cross pin 29 to engage through the slot of said lever arm end portion, preferably being provided with an anti-friction roller 30 to engage the sides of said slot, without play or backlash effect. It will be obvious that linear movement of the adjusting screw means will cause corresponding swinging movements of the lever arm 26, which, in turn, will effect rotative movements of the shaft 24. Such rotative movements of the shaft 24 may be transmitted and applied to the mechanism, apparatus, or parts thereof desired to be adjustably governed, as will be well understood.

It will be understood that the pitch differential between the members of the adjusting screw means, when required, is subject to a considerable range of variation, and that various other changes may be made in the detail forms and cooperating relationship of the screw members, according to the particular effect desired to be obtained in any given case as to application of the adjusting screw means to mechanism, apparatus or parts thereof desired to be adjustingly manipulated thereby.

It will be understood that the novel adjustment means of this invention may be applied to many different kinds of mechanism, apparatus, or parts thereof which require adjusting manipulation thereof in use. For example, the same may be used for rotatively adjusting, to a very precise and accurate degree variable or tuning condenser devices in radio apparatus; this being but one use illustrative of many other uses to which the adjusting means may be put.

It will likewise be understood that various changes could be made in construction and arrangement of the adjusting means as a whole, as well as in the details of the various elements forming the same, without departing from the invention as defined in the appended claim. It is therefore intended that all matter contained in the above description or shown in the accompanying drawing shall be interpreted as illustrative and not in a limiting sense.

I claim:

In means of the kind described, a compound adjusting screw assembly, said assembly comprising an externally threaded outer screw member rotatably mounted in threaded relation to and through a stationary support, said outer screw member having an internally threaded bore, and a non-rotatable externally threaded inner screw member threaded into said bore of the outer screw member and adapted to be linearly moved thereby when the latter is turned, the external threads of said outer screw member being of one selected pitch and the internal threads of its bore and the cooperating threads of said inner screw member being of the same direction but of less pitch, a rotative transmission shaft, and means connected with said inner screw member adapted to impart rotative movement to said shaft, said latter means comprising a slidably mounted rack adapted to be moved by the adjusting screw assembly, and gear means on said shaft operatively engaged by said rack.

HERMAN ULANET.